(12) United States Patent
Chin et al.

(10) Patent No.: US 7,570,754 B2
(45) Date of Patent: Aug. 4, 2009

(54) SYSTEM AND METHOD FOR ROUTING CALLS IN A TELECOMMUNICATIONS NETWORK

(75) Inventors: Frances Mu-Fen Chin, Naperville, IL (US); Jennifer L. Chou, Naperville, IL (US); Daisy Feng-Mei Su, Naperville, IL (US); Yu Yin, Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 829 days.

(21) Appl. No.: 10/858,989

(22) Filed: Jun. 2, 2004

(65) Prior Publication Data

US 2005/0271198 A1 Dec. 8, 2005

(51) Int. Cl.
 *H04M 7/00* (2006.01)
 *H04M 3/42* (2006.01)
(52) U.S. Cl. .................... 379/221.02; 379/201.07; 379/207.12; 379/221.13
(58) Field of Classification Search .......... 379/221.02
 See application file for complete search history.

(56) References Cited

U.S. PATENT DOCUMENTS

| | | | | |
|---|---|---|---|---|
| 5,781,620 A | * | 7/1998 | Montgomery et al. | 379/114.02 |
| 5,960,348 A | * | 9/1999 | Eisdorfer et al. | 455/445 |
| 6,006,094 A | * | 12/1999 | Lee | 455/445 |
| 6,324,277 B1 | * | 11/2001 | Akinpelu et al. | 379/221.02 |
| 6,330,311 B1 | * | 12/2001 | Mijares et al. | 379/112.01 |
| 6,415,025 B1 | * | 7/2002 | Bruno et al. | 379/143 |
| 6,771,950 B1 | * | 8/2004 | Shupe et al. | 455/414.1 |
| 2002/0101974 A1 | * | 8/2002 | Zbib | 379/221.02 |
| 2004/0162068 A1 | * | 8/2004 | Lamb et al. | 455/432.1 |
| 2004/0198327 A1 | * | 10/2004 | Bates et al. | 455/414.1 |

* cited by examiner

*Primary Examiner*—Rasha S Al Aubaidi (57) ABSTRACT

A system and method of routing calls in a telecommunications network is provided. The method includes receiving an incoming call for the called party, determining the called party location, selecting a long distance carrier preferred by the called party for incoming calls made to the called party location, and routing the call to the called party using the selected long distance carrier. The system includes means for receiving an incoming call for the called party, means for determining the called party location, means for selecting a long distance carrier preferred by the called party for incoming calls made to the called party location, and means for routing the call to the called party using the selected long distance carrier.

6 Claims, 8 Drawing Sheets

SYSTEM AND METHOD FOR ROUTING CALLS IN A TELECOMMUNICATIONS NETWORK

BACKGROUND OF THE INVENTION

This invention relates to the art of telecommunications and more particularly to a system and method for routing a call in a telecommunications network using a called-party-preferred Long Distance Carrier.

Telecommunications systems enable a calling party to communicate with a called party by providing either circuit switched or packet-based connection between the calling party terminal and the called party terminal. When the distance between the terminals is great, a Long Distance Carrier having the facilities for routing calls over long distances is used to route the call.

Often times, the calling party has some choice in selecting the Long Distance Carrier. However, sometimes the called party must pay for the Long Distance Carrier to route calls to them. For example, many times when the called party is using a wireless terminal, also referred to as a cellular phone, to receive the incoming call the called party pays for the Long Distance Carrier to route the call to them. It is therefore, desirable for the called party to have the ability to select the Long Distance Carrier that will be used to route an incoming call to them.

SUMMARY OF THE INVENTION

According to the present invention, a method of routing a call to a called party in a telecommunications network is provided.

In accordance with a first aspect of the invention, the method includes receiving an incoming call for the called party, determining the called party location, selecting a long distance carrier preferred by the called party for incoming calls made to the called party location, and routing the call to the called party using the selected long distance carrier.

Further, according to the present invention, a system for routing a call to a called party in a telecommunications network is provided. The system includes means for receiving an incoming call for the called party, means for determining the called party location, means for selecting a long distance carrier preferred by the called party for incoming calls made to the called party location, and means for routing the call to the called party using the selected long distance carrier.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF THE INVENTION

Figure 1:
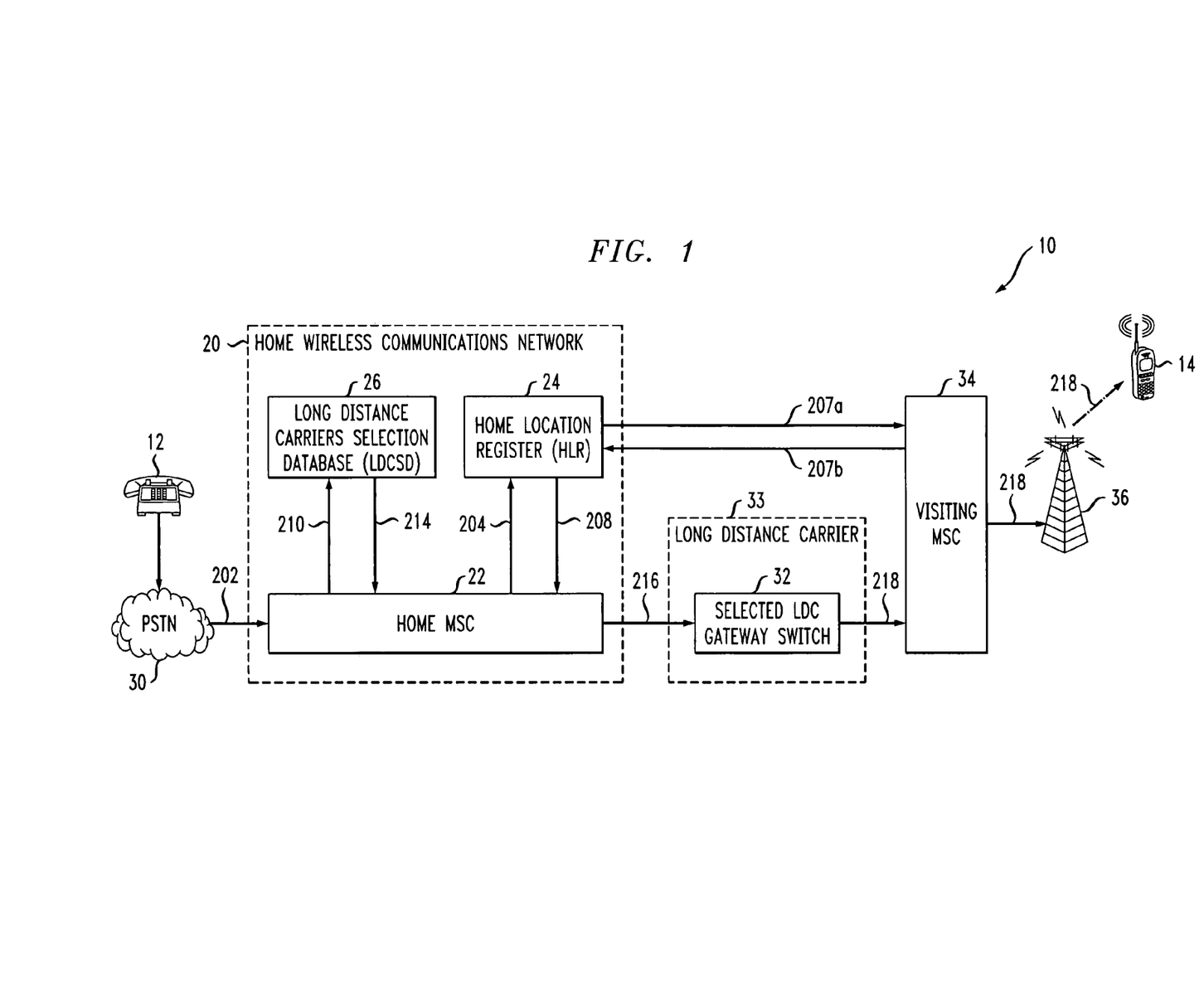
FIG. 1 is a diagrammatic illustration showing a first embodiment of the present invention.

Referring to FIG. 1, a portion of a telecommunications network is shown generally at 10. The telecommunications network 10 provides communication between a calling party terminal 12 and a called party terminal 14. The calling party uses the calling party terminal 12 to call the called party who receives the call on the called party terminal 14. The calling party terminal 12 can be a PSTN wireline terminal or a wireless terminal, also known as a cellular phone. The called party terminal 14 can be any suitable known wireless terminal.

The telecommunications network 10 includes the called party's home wireless communications network 20. The called party subscribes to the communications services of the home network 20 provided by a service provider (not shown) and can also be referred to as a subscriber. The invention can be made available by the service provider on a subscription basis to subscribers. The home wireless communications network 20 includes a home Mobile Switching Center (home MSC) 22 which sets up calls and routes incoming calls made to the called party terminal 14.

The home wireless communications network 20 also includes a Home Location Register (HLR) 24 for storing and/or determining the current location of called party at the time of the incoming call, also referred to as the called party location information. The called party location information is typically used by the home MSC 22 for routing calls to the called party terminal 14. As described in further detail below, the called party location information is used for selecting the called-party-preferred Long Distance Carrier for incoming calls made to the called party.

The home wireless communications network 20 also includes a Long Distance Carrier Selection Database (LDCSD) 26. The LDCSDB 26 can be located on any suitable node, such as an application server, in the home wireless communications network 20. The LDCSDB 26 includes called-party-preferred Long Distance Carriers which are previously provided by the called party for different destinations as described in further detail below. The called-party-preferred Long Distance Carrier is selected from the database based on the destination of the call, which is location of the called party at the time of the call. The selected Long Distance Carrier is then used for routing the call to the called party.

The calling party terminal 12 can be connected to the home wireless communications network 20 via the Public Switched Telephone Network 30, or via the wireless communications network 20, or in any other suitable known manner for communicating with the home MSC 22.

The telecommunications network 10 also includes a selected Long Distance Carrier Gateway Switch 32 belonging to the Long Distance Carrier 33 selected to carry the call to the called party. A call that is to be carried by the Long Distance Carrier 33 is routed to the Long Distance Carrier Gateway Switch 32 which provides entry of the call into the carrier's long distance network 33 for routing to the called party terminal 14.

The telecommunications network 10 also includes a visiting Mobile Switching Center (MSC) 34 disposed at or near the called party location. The called party terminal 14 communicates with the rest of the telecommunications network 10 using the visiting MSC 34 and the base station 36. The visiting MSC 34 is responsible for setting up and routing calls to the called party terminal 14 at the called party location. The called party can be roaming and the called party location can be far from the home wireless communications network 20. The selected Long Distance Carrier 33 routes the call to the called party terminal 14 via the visiting MSC 34.

Figure 2:
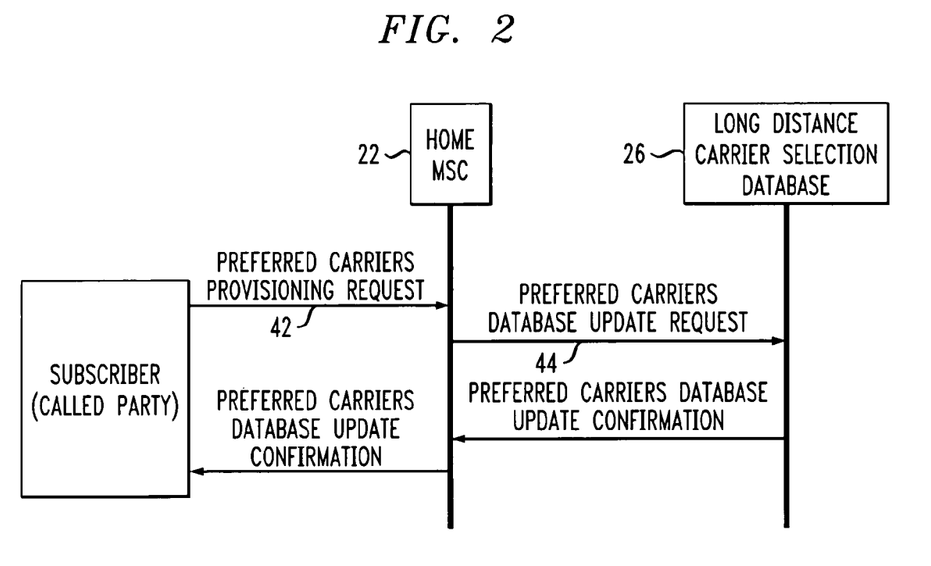
FIG. 2 illustrates how a subscriber provides called-party-preferred Long Distance Carriers in accordance with the invention.

The called party provisions the LDCSDB 26 with called-party-preferred Long Distance Carriers as shown in FIG. 2. The called party provides the called-party-preferred Long Distance Carriers, each preferred for routing long distance calls to a different called party location. The incoming call is routed to the location of the called party at the time the call is made using the selected called-party-preferred Long Distance Carrier 33 provided for that called party location. For example, the called party may want the called-party-preferred Long Distance Carrier to be AT&T for called party locations in the USA, the called-party-preferred Long Distance Carrier to be Telstra for called party locations in Australia, the called-party-preferred Long Distance Carrier to be China Telecom for called party locations in China. The called party locations can be any suitable size of location, including but not limited to a country, a state, a city, or even locations smaller than a city.

As shown in FIG. 2, the called party, also referred to as the subscriber, provides the called-party-preferred Long Distance Carriers to the Home MSC 22 at 42 which then updates the LDCSDB 26 at 44. Each called-party-preferred Long Distance Carrier is associated with the called party and a called party location in the LDCSDB 26. The subscriber can provide the called-party-preferred Long Distance Carriers in any suitable manner using any suitable known connection, including but not limited to using a dial up connection and keying the information in, using an internet connection with a computer, or a voice connection for communicating with a service provider operator, or computer application, that provisions the database 26. It should be appreciated that the subscriber may be connected to another node in the telecommunications network 10, rather than the Home MSC 22 as shown in FIG. 2, for providing the called-party-preferred Long Distance Carriers.

The operation of the invention shall be described using an example, which should not be considered limiting, and a series of method steps. For the examples provided herein, the called party is roaming and is connected to the telecommunications network 10 by the visiting MSC 34. For the example shown in FIG. 1, the called party is at the called party location of Chicago and has previously provided the called-party-preferred Long Distance Carrier of MCI for that destination as shown in FIG. 2.

Figure 3:
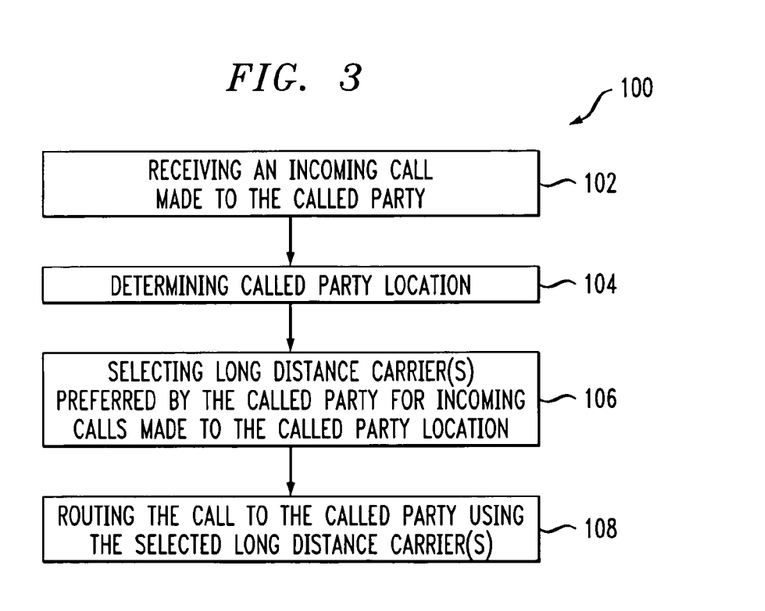
FIG. 3 is a flow chart illustrating a method of routing a call in accordance with the invention.

Referring now to FIG. 3, a method of routing a call to a called party in a telecommunications network using a called-party-preferred Long Distance Carrier is shown generally at 100. The calling party calls the called party initiating an incoming call from the calling party terminal 12 to the called party terminal 14 over the telecommunications network 10.

The method 100 includes receiving an incoming call to the called party terminal 14 at the called party's home wireless communications network 20 at 102. For the examples provided herein, the Home Mobile Switch Center (home MSC) can receive the call in the form of call control messaging such as an ANSI 41 INVITE message during call setup, or in any other suitable known manner.

The method 100 also includes determining the called party location at 104. The called party location, which is used for routing incoming calls to the called party, can be determined in any suitable known manner. In this example, the called party location is determined to be Chicago.

The method 100 also includes selecting a called-party-preferred Long Distance Carrier for the incoming call made to the called party location of Chicago at 106. The method 100 also includes routing the call to the called party terminal 14 using the selected Long Distance Carrier at 108.

Figure 4:
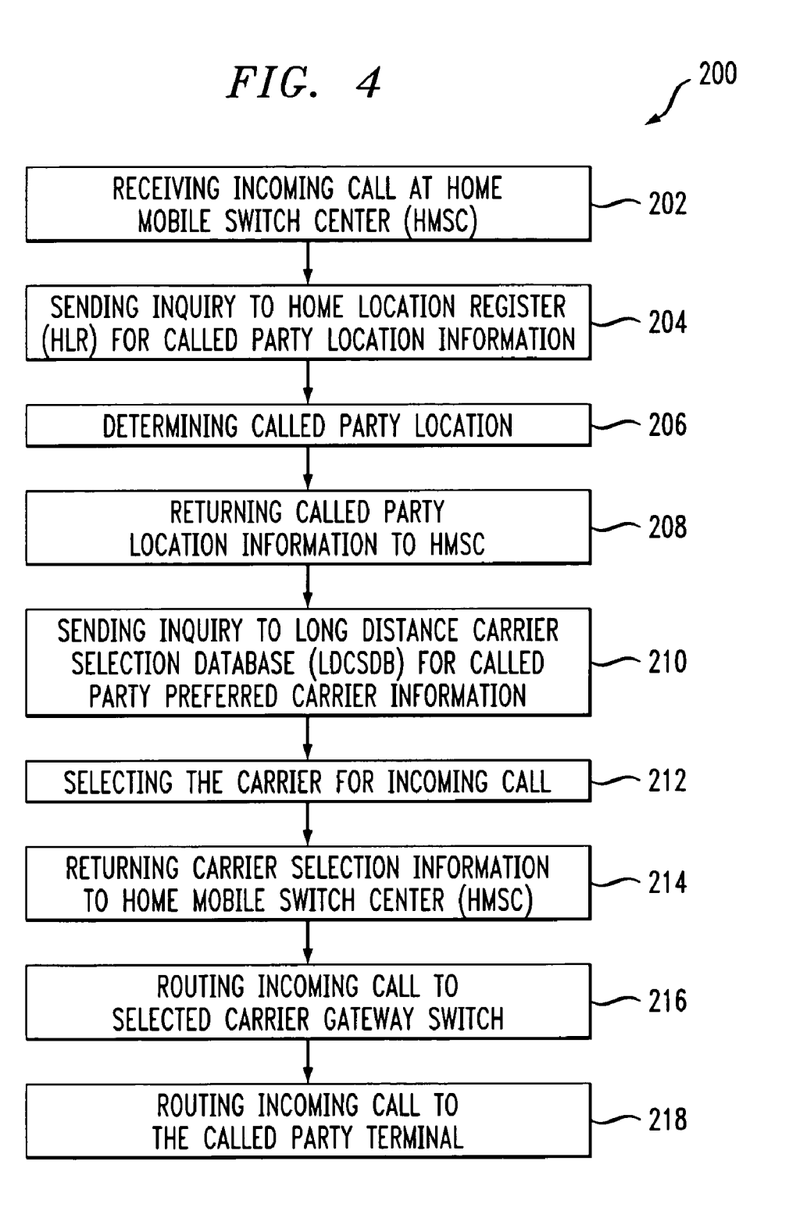
FIG. 4 is a flow chart illustrating a method of routing a call for the embodiment shown in FIG. 1.

Referring now to FIGS. 1 and 4 the operation of the embodiment shown in FIG. 1 shall now be described using the series of method steps 200 shown in FIG. 4. The method 200 includes receiving the incoming call made to the called party terminal 14 at the home MSC 22 at 202. The method 200 also includes sending an inquiry to the HLR 24 for the called party location information at 204. The inquiries and responses described in all of the examples provided herein can use call control messaging such as ANSI 41, or MAP, or any other suitable protocol and may include one or more new messages. The inquiry identifies the called party in any suitable known manner, such as for example using the called party phone number.

The HLR 24 determines the called party location in any suitable known manner at 206, or alternatively the called party location is determined by another node in the telecommunications network and transferred to the HLR 24 for storage. For example, the HLR 24 can determine the called party location by sending an IS-41 RouteRequest message to the visiting MSC 34 at 207a. The visiting MSC 34 sends a response to the HLR 24 at 207b including a Temporary Location Directory Number (TLDN) used for routing the call to the called party terminal 14. The TLDN can be used for determining and/or indicating the called party location. The method 200 also includes returning the called party location information to the home MSC 22 at 208.

The method 200 also includes sending an inquiry to the LDCSDB 26 at 210 for called-party-preferred Long Distance Carrier Selection information. The inquiry includes the called party location information as well as information identifying the called party such as, for example, the called party phone number. The method 200 also includes selecting the called-party-preferred Long Distance Carrier 33 at 212 for the incoming call provided by the called party as described above, for the called party location determined at 206. Using the same example provided above, the called-party-preferred Long Distance Carrier MCI is selected because it was provided as the called-party-preferred Long Distance Carrier for routing incoming calls to the called party terminal 14 when in Chicago. The selected Long Distance Carrier is identified in any suitable known manner. For example, the selected called-party-preferred Long Distance Carrier MCI can be identified using a decimal carrier code which may be allocated by the FCC. The selected called-party-preferred Long Distance Carrier Long Distance carrier 33 associated with the called party at the called party location, MCI in this example identified by the carrier code 222, is returned to the home MSC 22 at 214.

The method 200 also includes routing the incoming call from the home MSC 22 to the selected Long Distance Carrier gateway switch 32 at 216. The home MSC 22 uses the carrier code to choose the proper bearer facility for routing the call to the selected gateway switch 32. The method also includes routing the call from the selected Long Distance Carrier 33 to the called party terminal 14 at 218. The call is routed to the visiting MSC 34 and on to the called party terminal 14.

Figure 5:
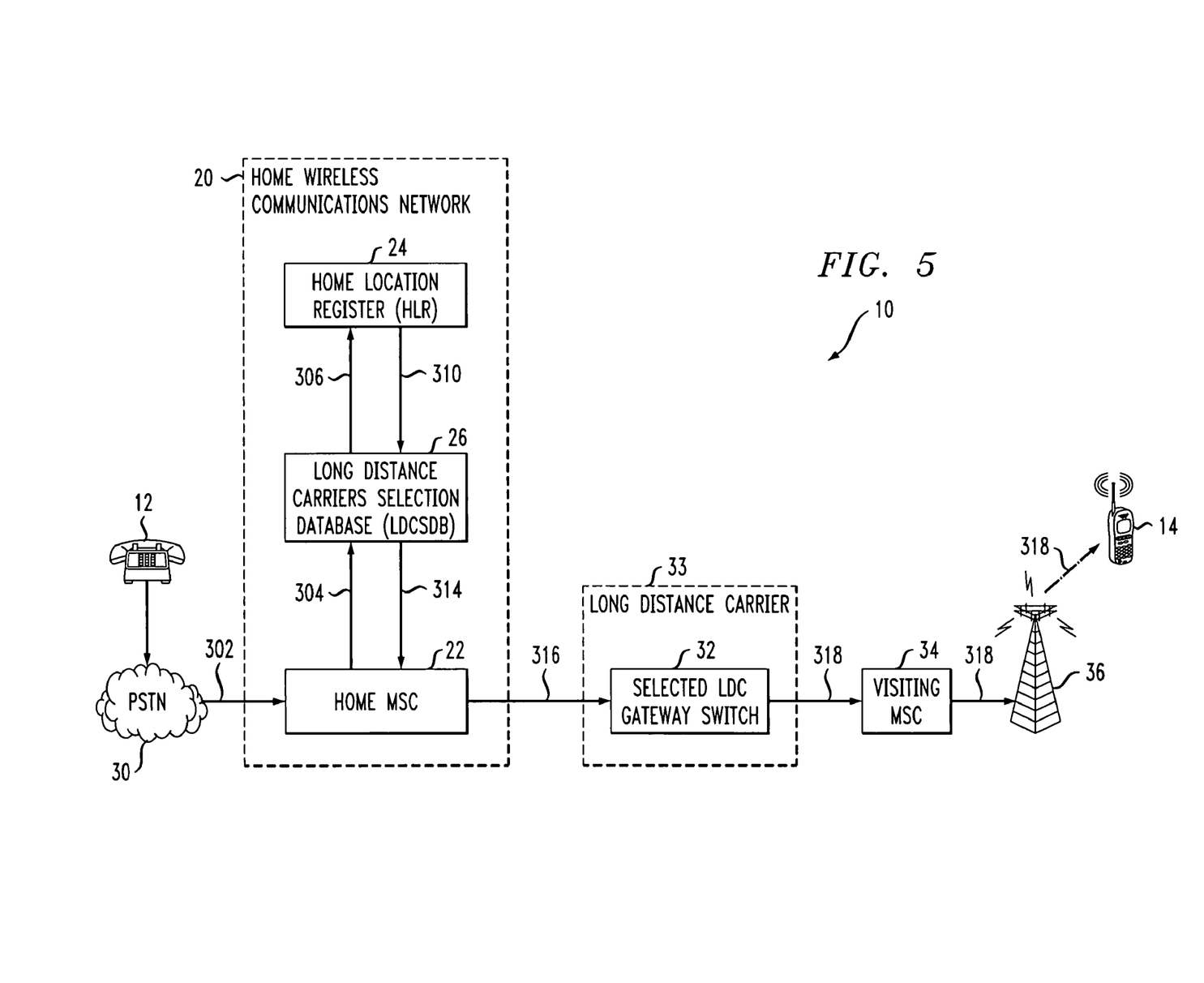
FIG. 5 is a diagrammatic illustration showing a second embodiment of the present invention.
Figure 6:
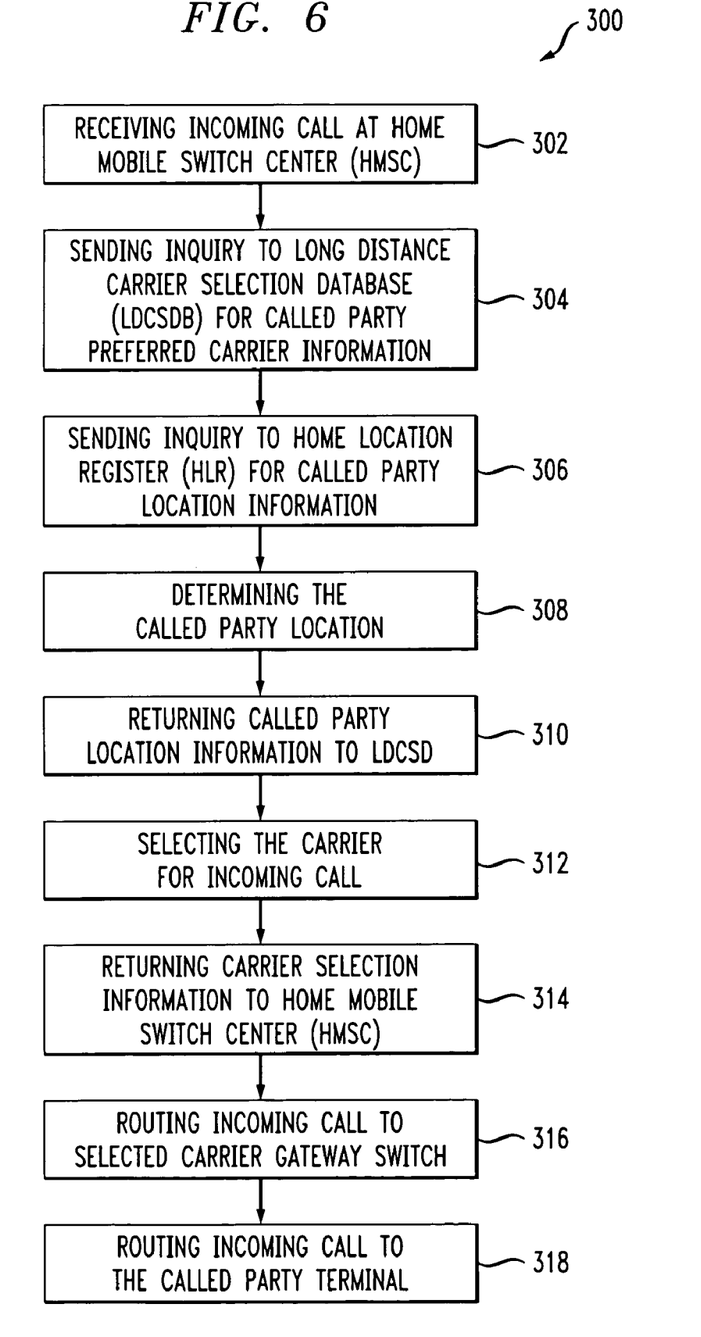
FIG. 6 is a flow chart illustrating a method of routing a call for the embodiment shown in FIG. 5.

Another embodiment of the invention is shown in FIG. 5 using the same reference numerals as FIG. 1 for similar components. The method 300 shown in FIG. 6 describes the operation of this embodiment. The method 300 includes receiving the incoming call made to the called party terminal 14 at the home MSC 22 at 302. The method 300 includes sending an inquiry to the LDCSDB 26 for called party preferred Long Distance Carrier information at 304. The inquiry can use similar call control messaging as described above. The method 300 also includes sending a called party location inquiry from the LDCSDB 26 to the HLR 24 at 306. The method 300 also includes determining the called party location at 308 which can be determined as described above or in any other suitable known manner, and returning the called party location information to the LDCSDB at 310. The method 300 also includes selecting the called-party-preferred Long Distance Carrier based on the called party location at 312 and returning the selected Long Distance Carrier 33 to the home MSC at 314. The incoming call is routed to the carrier gateway switch 32 corresponding to the selected Long Distance Carrier 33 at 316 and to the called party terminal at 318 in a similar manner as described above.

Figure 7:
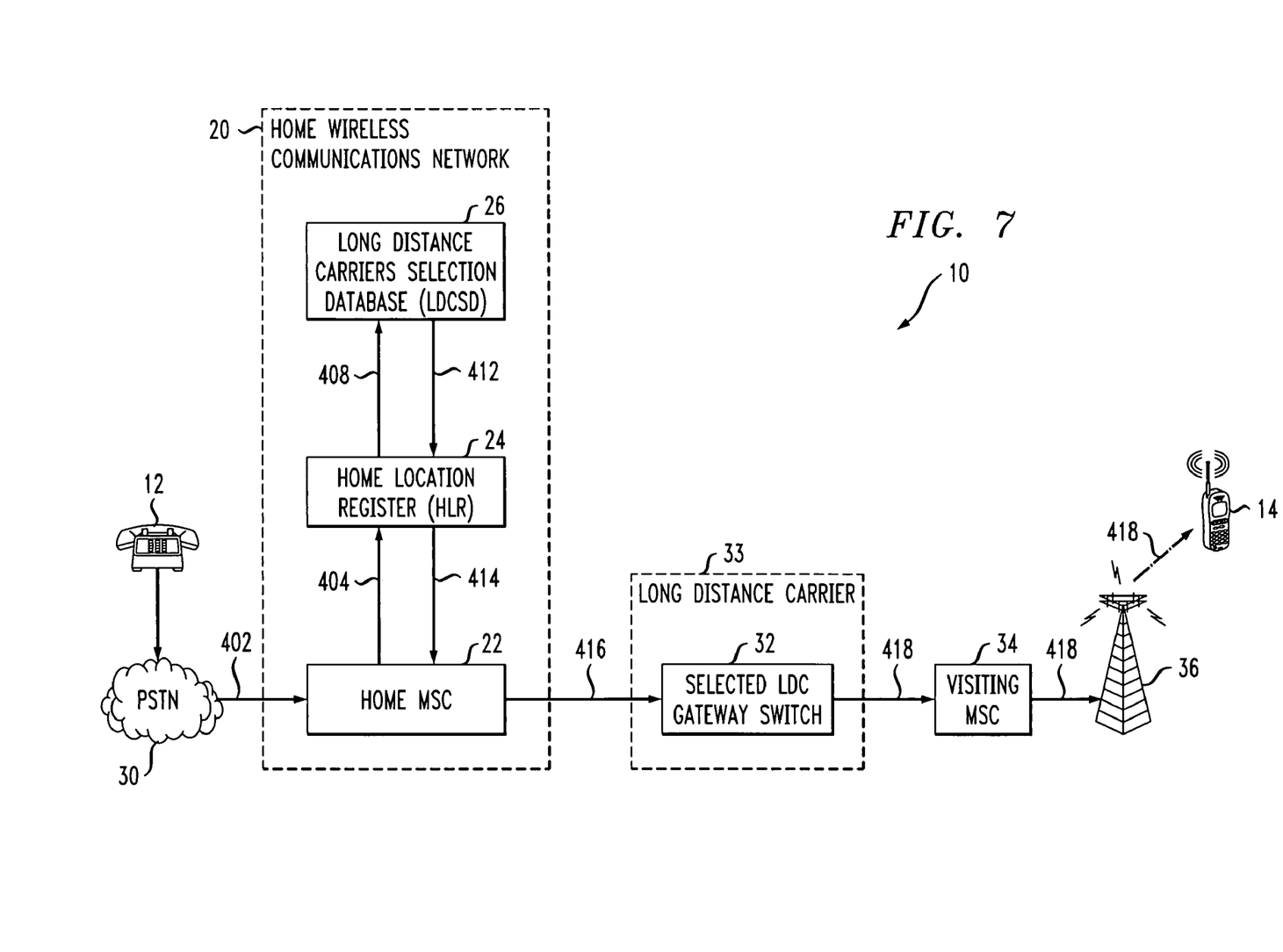
FIG. 7 is a diagrammatic illustration showing another embodiment of the present invention.
Figure 8:
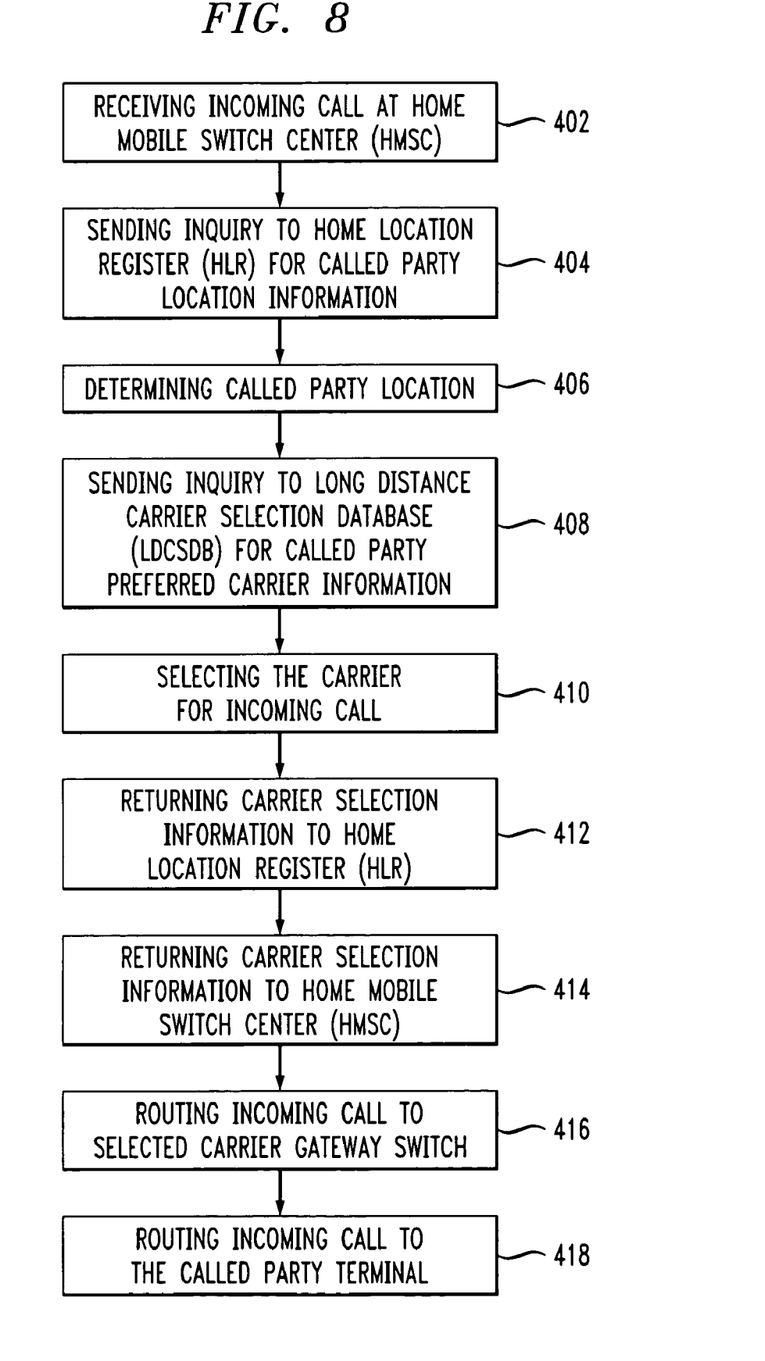
FIG. 8 is a flow chart illustrating a method of routing a call for the embodiment shown in FIG. 7.

Yet another embodiment of the invention is shown in FIG. 7 using the same reference numerals as FIG. 1 for similar components. The method 400 shown in FIG. 8 describes the operation of this embodiment. The method 400 includes receiving the incoming call made to the called party terminal 14 at the home MSC 22 at 402. The method 400 includes sending an inquiry to the HLR 24 for called party location information at 404. The method 400 also includes determining the called party location at 406 which can be determined as described above or in any other suitable known manner. The method 400 also includes sending an inquiry for called-party-preferred carrier information from the HLR 24 to the LDCSDB 26 at 408. The method 400 also includes selecting the called-party-preferred Long Distance Carrier based on the called party location at 410 and returning the selected Long Distance Carrier 33 to the HLR 24 at 412. The selected Long Distance Carrier 33 is returned to the home MSC 22 at 414. The incoming call is routed to the selected carrier gateway switch 32 corresponding to the selected Long Distance Carrier 33 at 416 and to the called party terminal at 418 in a similar manner as described above.

Figure 9:
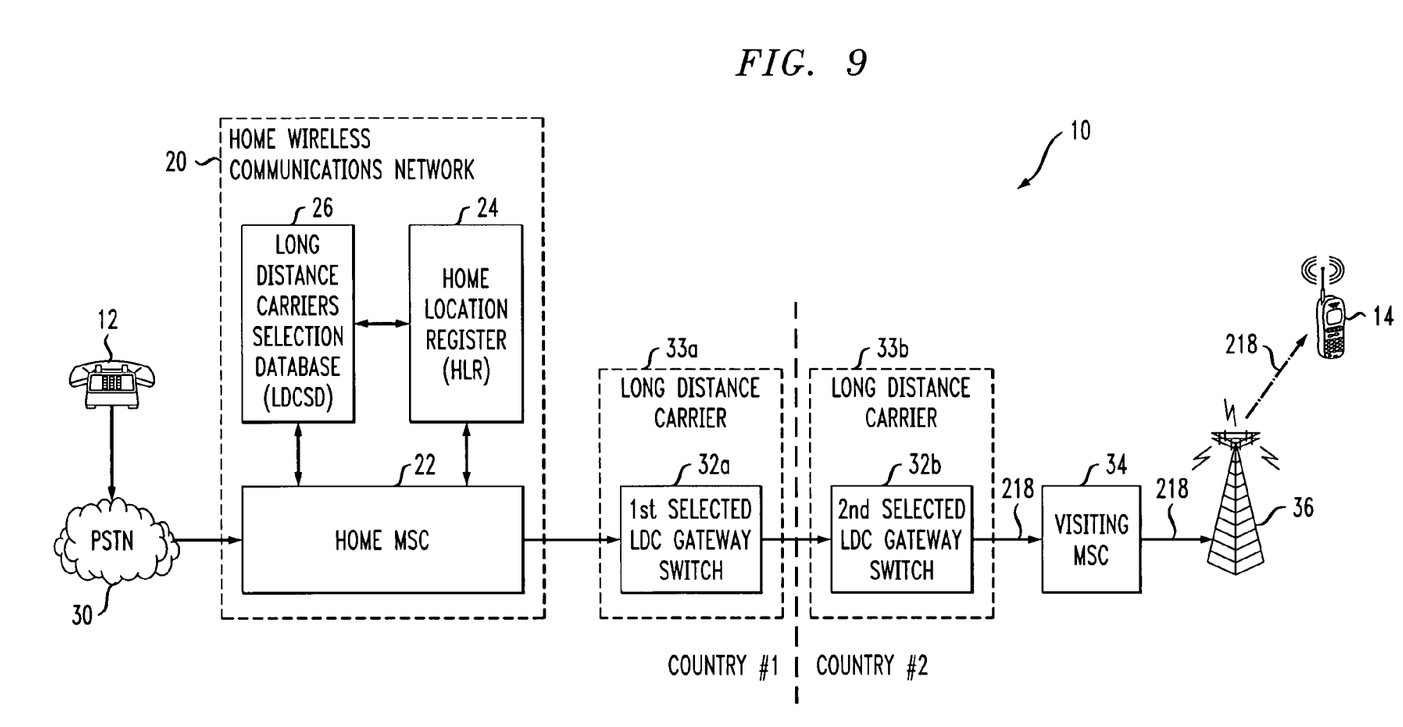
FIG. 9 is a diagrammatic illustration showing another embodiment of the present invention.

It should be appreciated that any of the embodiments described above can select more than one Long Distance Carrier to route the incoming call to the called party terminal 14. Referring now to FIG. 9, an example is shown in which two Long Distance Carriers 33a and 33b, having respective Long Distance Carrier Gateway Switches 32a and 32b, are selected to route the incoming call from the home MSC 22 located in COUNTRY #1 to the called party terminal 14 located in COUNTRY #2. Each Long Distance Carrier 33a, 33b routes the call over a different leg of the call route. In this example, each leg is in a different country. However, it should be appreciated that each leg may be in the same country. Further, any suitable number of Long Distance Carriers can be selected in dependence on the called party location and the called-party-preferred Long Distance Carriers provided by the called party needed to route the call to the called party terminal 14.

The invention enables a called party to provide call-party-preferred Long Distance Carriers for different called party locations. Further the invention enables the selection of the called-party-preferred Long Distance Carrier(s) based on the called party location at the time of the call and the use of the selected Long Distance Carrier(s) in routing the call to the called party terminal 14.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of routing a call to a called party having a home wireless communications network comprising:

the called party providing different called-party-preferred long distance carriers for routing calls to different called party locations, each long distance carrier being a different communications network than the called party's home network and the visited network with a gateway switch providing entry for calls routed from the called party's home network into the associated long distance carrier's network;

the called party roaming and communicating via a visiting MSC at a called party location;

receiving an incoming call for the called party at the called party's home wireless communications network, the network including a called party's home mobile switching center (HMSC);

determining called party location information including the called party location;

the HMSC sending an inquiry for the called-party-preferred long distance carrier provided by the called party for routing calls to the visiting MSC at the called party location;

the HMSC receiving identification of the called-party-preferred long distance carrier provided by the called party for the called party location in response to the inquiry; and routing the call from the home wireless communications network to the visiting MSC and the called party using the selected called-party-preferred long distance carrier via the selected called-party-preferred long distance carrier's gateway switch.

2. The method defined in claim 1 further comprising:

sending an inquiry for called party location information to the Home Location Register (HLR); and receiving the called party location information from the HLR.

3. The method defined in claim 1 further comprising:
selecting a plurality of long distance carriers preferred by the called party for routing incoming calls made to the called party location over different legs of the call route; and
routing the call to the called party using the selected long distance carriers.

4. The method defined in claim 1 wherein the sending the inquiry includes sending the inquiry to a Long Distance Carrier Selection Database (LDCSDB), the inquiry including the called party location.

5. The method defined in claim 1 wherein the sending the inquiry includes sending the inquiry to a Long Distance Carrier Selection Database (LDCSDB) and further comprising:
the LDCSDB sending a called party location inquiry to a Home Location Register; and
the LDCSDB receiving called party location information from the HLR.

6. A system for routing a call to a called party having a home wireless communications network and roaming thereby communicating via a visiting MSC, the system comprising:
a Long Distance Carrier Selection Database (LDCSDB) for storing different called-party-preferred long distance carriers for different called party locations and for routing incoming calls made to a called party location over different legs of the call route, each long distance carrier being a different communications network than the called party's home network with a gateway switch providing entry for calls from the called party's home network into the associated long distance carrier's network;
a Home Mobile Switching Center (HMSC) in the called party's home wireless communications network receiving an incoming call for the called party, the HMSC sending an inquiry for the called-party-preferred long distance carrier for the called party location, receiving in response to the inquiry identification of a selected called-party-preferred long distance carrier for routing calls to the called party location, and routing the call to the selected called-party-preferred long distance carrier gateway switch for subsequent routing by the called-party-preferred long distance carrier to the visiting MSC; and
means for selecting a plurality of called-party-preferred long distance carriers used for routing an incoming call made to the called party location over different legs of the call route, wherein the HMSC routes the incoming call to the called party using the selected plurality of called-party-preferred long distance carriers via the selected plurality of called-party-preferred long distance carrier's gateway switches.

* * * * *